United States Patent
Kim

(10) Patent No.: US 8,380,378 B2
(45) Date of Patent: Feb. 19, 2013

(54) CONTROL METHOD OF ELECTRONIC BRAKE

(75) Inventor: Myoung June Kim, Gyeonggi-do (KR)

(73) Assignee: Mando Corporation, Pyeongtack-Si (KR)

(*) Notice: Subject to any disclaimer, the term of this patent is extended or adjusted under 35 U.S.C. 154(b) by 350 days.

(21) Appl. No.: 12/874,620

(22) Filed: Sep. 2, 2010

(65) Prior Publication Data

US 2011/0060511 A1   Mar. 10, 2011

(30) Foreign Application Priority Data

Sep. 9, 2009   (KR) .................. 10-2009-0084784

(51) Int. Cl.
  *B60T 8/58*   (2006.01)
  *G06F 19/00*  (2006.01)
(52) U.S. Cl. ................... 701/22; 701/74; 303/152
(58) Field of Classification Search .............. 701/22, 701/70, 74; 303/3, 152, 177; 180/65.1, 6.5; 318/376; 188/162
See application file for complete search history.

(56) References Cited

U.S. PATENT DOCUMENTS

| | | | | |
|---|---|---|---|---|
| 6,008,604 | A  | * 12/1999 | Maisch | 188/162 |
| 2001/0033106 | A1 | * 10/2001 | Shirai et al. | 303/177 |
| 2004/0104618 | A1 | * 6/2004 | Yamamoto et al. | 303/20 |
| 2005/0269875 | A1 | * 12/2005 | Maki et al. | 303/152 |

FOREIGN PATENT DOCUMENTS

| | | |
|---|---|---|
| JP | 05-213175 | 8/1993 |
| KR | 10-2004-0101123 A | 12/2004 |

OTHER PUBLICATIONS

German Office Action, and English translation thereof, issued in German Patent Application No. 10 2010 034 725.6 dated Feb. 20, 2012.

* cited by examiner

*Primary Examiner* — Tan Q Nguyen
(74) *Attorney, Agent, or Firm* — McDermott Will & Emery LLP

(57) ABSTRACT

Disclosed herein is a method of controlling an Anti-lock Brake system (ABS) of an electronic brake, which is driven using an electric motor. In ABS braking in which braking and braking-release motions are repeated according to a wheel slip value, the electric motor is controlled in a re-braking section to link a position of a brake pad with a change in wheel speed, to enhance ABS control responsiveness and to reduce stopping distance with maximized brake force.

4 Claims, 4 Drawing Sheets

CONTROL METHOD OF ELECTRONIC BRAKE

CROSS-REFERENCE TO RELATED APPLICATION

This application claims the benefit of Korean Patent Application No. 2009-0084784, filed on Sep. 9, 2009 in the Korean Intellectual Property Office, the disclosure of which is incorporated herein by reference.

BACKGROUND

1. Field

Embodiments of the present invention relate to a method of controlling an Anti-lock Brake system (ABS) of an electronic brake, which is driven using an electric motor.

2. Description of the Related Art

An electronic brake to be driven using an electric motor is used to reduce speed of a vehicle or stop the vehicle, or to keep the vehicle stationary. Such an electronic brake conventionally generates brake force by strongly compressing opposite sides of a disc, rotated along with a wheel, using brake pads.

When performing Anti-Lock Brake System (ABS) braking in which braking and braking-release motions are repeated at a rapid period using such an electronic brake, maintaining a vehicular wheel slip value in a band as close to optimal as possible may be necessary to achieve vehicle stability and to reduce stopping distance. Maintaining a vehicular wheel slip value in a band as close to optimal as possible serves to reduce variation of the wheel slip value. To this end, it may be very important to control a position of an electric motor to assure rapid reciprocating movement thereof.

The most basic motor control method in relation to ABS braking is to reciprocate an electric motor between a braking position and a braking-release position according to a change in wheel speed. A variety of known methods may be used to determine the two braking and braking-release positions and to determine reciprocating movement conditions between the two positions. For example, in a method based on a wheel slip value, the electric motor is moved from the braking position to the braking-release position under the condition that wheel locking (i.e. a braking-release section) is determined if the wheel slip value exceeds a predetermined value, whereby brake force is reduced. Also, the electric motor is moved from the braking-release position to the braking position under the condition that reapplication of brake force (i.e. a re-braking section) is determined if the wheel slip value is smaller than the predetermined value, whereby brake force is again generated.

Although rapid implementation of braking and braking-release motions during ABS braking depends on the maximum operating speed of an actuator (e.g., the electric motor and a speed-reduction gear) that is used to move brake pads in the electronic brake, the brake force is inversely proportional to the movement speed of the brake pads and thus, there is a limit to how much the movement speed of the brake pads can be increased. Accordingly, in consideration of the present technology level in relation to the actuator (the electric motor and the speed reduction gear), position control of the brake pads (more particularly, position control of the electric motor) may often be slower than a change in wheel speed. Thus, conventional motor position control methods have difficulty acquisition of excellent ABS control responding performance.

SUMMARY

Therefore, it is an aspect of the present invention to provide a control method of an electronic brake, which controls an electric motor such that a position of a brake pad is linked with a change in wheel speed in a re-braking section of ABS braking.

Additional aspects of the invention will be set forth in part in the description which follows and, in part, will be obvious from the description, or may be learned by practice of the invention.

In accordance with one aspect of the present invention, an electronic brake control method to control a position of an electric motor during Anti-lock Brake System (ABS) braking in which braking and braking-release motions are repeated using an electronic brake, includes sensing a wheel speed, calculating a wheel slip value according to a change in the wheel speed, sensing the wheel slip value and the position of the electric motor at times when braking-release and re-braking sections begin respectively, determining a target position value of the electric motor corresponding to the wheel slip value by performing linear interpolation of the wheel slip value and the position of the electric motor in a section between the braking-release section and the re-braking section, and controlling the position of the electric motor in the re-braking section according to the determined target position value.

The control of the position of the electric motor may include applying a motor position control method to the electric motor according to the determined target position value so as to move a brake pad toward a rotor.

The position of the electric motor may be controlled in the re-braking section such that a position of the brake pad is linked with a change in the wheel speed.

The wheel slip value may be calculated from a difference between the wheel speed and a vehicle velocity.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
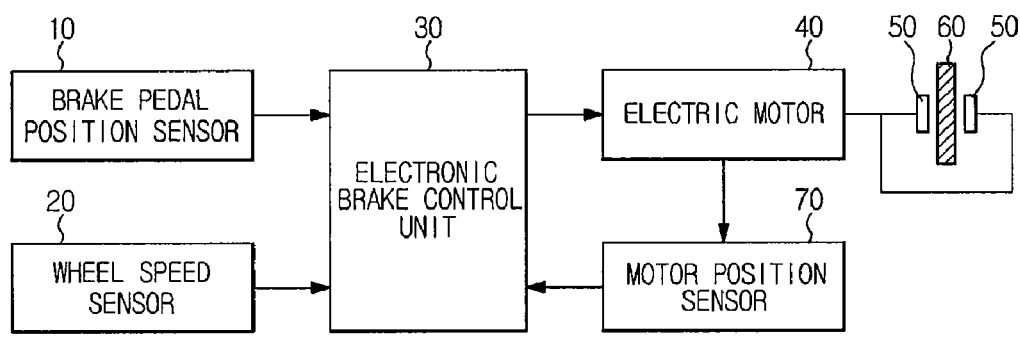
FIG. 1 is a control block diagram illustrating an Anti-lock Brake System (ABS) of an electronic brake in accordance with an embodiment of the present invention.

Reference will now be made in detail to the embodiments of the present invention, examples of which are illustrated in the accompanying drawings, wherein like reference numerals refer to like elements throughout.

FIG. 1 is a control block diagram illustrating an Anti-lock Brake System (ABS) of an electronic brake in accordance with an embodiment of the present invention.

In FIG. 1, the ABS control system of the electronic brake in accordance with the embodiment of the present invention includes a brake pedal position sensor 10, wheel speed sensor 20, electronic brake control unit 30, electric motor 40 and motor position sensor 70.

The brake pedal position sensor 10 serves to sense pedal force applied to a brake pedal by a driver, i.e. a position of the brake pedal, and to transmit a sensed signal to the electronic brake control unit 30.

The wheel speed sensor 20 is provided at each of vehicular wheels FL, RR, RL and FR and serves to sense the speed of the wheel and to transmit a sensed signal to the electronic brake control unit 30.

The electronic brake control unit 30 functions to apply a motor position control command to the electric motor 40 upon receiving the sensed signal indicating the position of the brake pedal from the brake pedal position sensor 10, in order to generate brake force corresponding to the pedal force applied to the brake pedal by the driver. If the electric motor 40 is operated in response to the motor position control command, brake pads 50 are moved toward a rotor 60 via operation of the electric motor 40, resulting in generation of brake force.

The electronic brake control unit 30 also functions to calculate a vehicle velocity upon receiving the sensed signal indicating the wheel speed from the wheel speed sensor 20, so as to determine a wheel slip value based on a difference between the wheel speed and the vehicle velocity. In this way, the electronic brake control unit 30 performs ABS braking in which braking and braking-release motions are repeated according to an increase or decrease in the wheel slip value. In relation to the ABS braking in which braking and braking-release motions are repeated, it may be very important to set a target position value required to control the position of the electric motor 40. In the embodiment of the present invention, the target position value is set using the wheel slip value and the position of the electric motor 40, to link the moving speed of the brake pads 50 to a change in wheel speed.

The motor position sensor 70 serves to sense the position of the electric motor 40 and to transmit a sensed signal to the electronic brake control unit 30.

Figure 2:
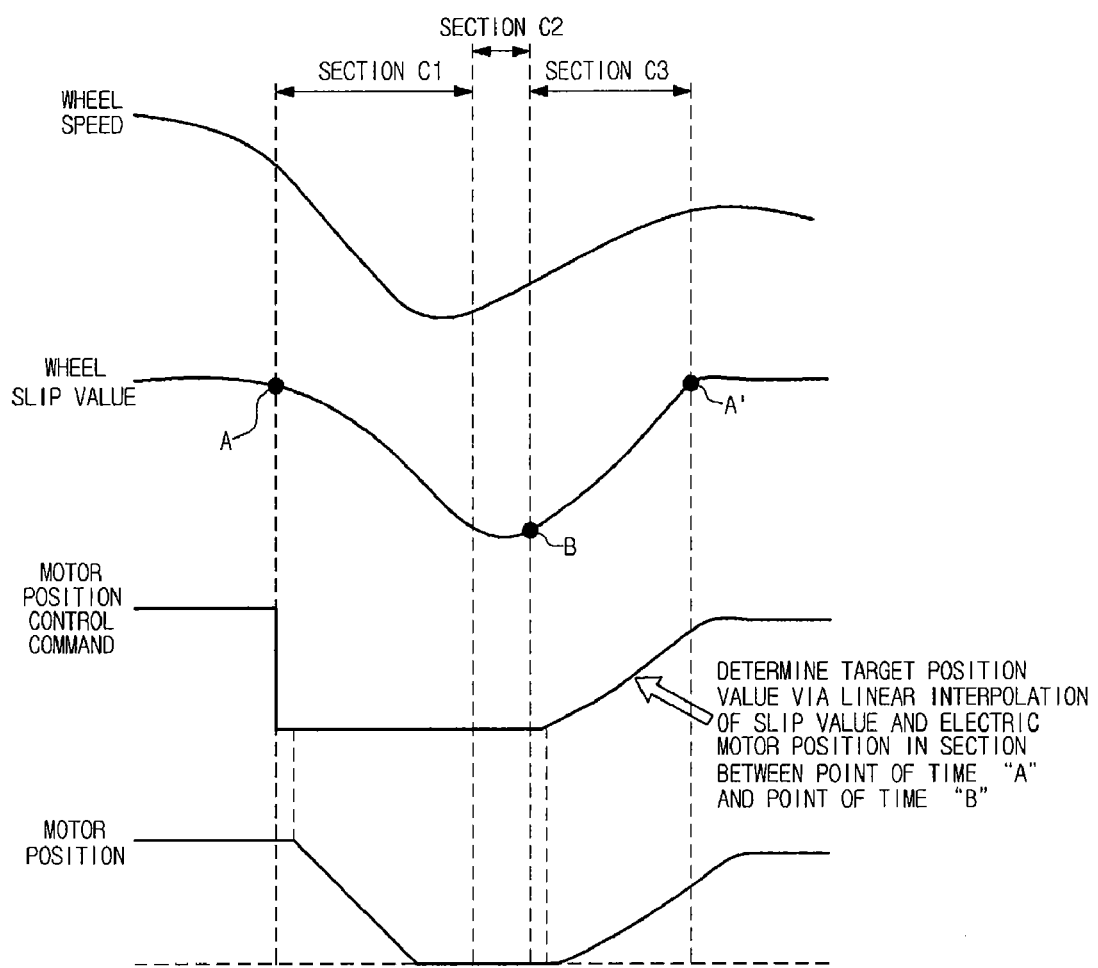
FIG. 2 is a view illustrating one example of an ABS control pattern of the electronic brake in accordance with the embodiment of the present invention.
Figure 3:
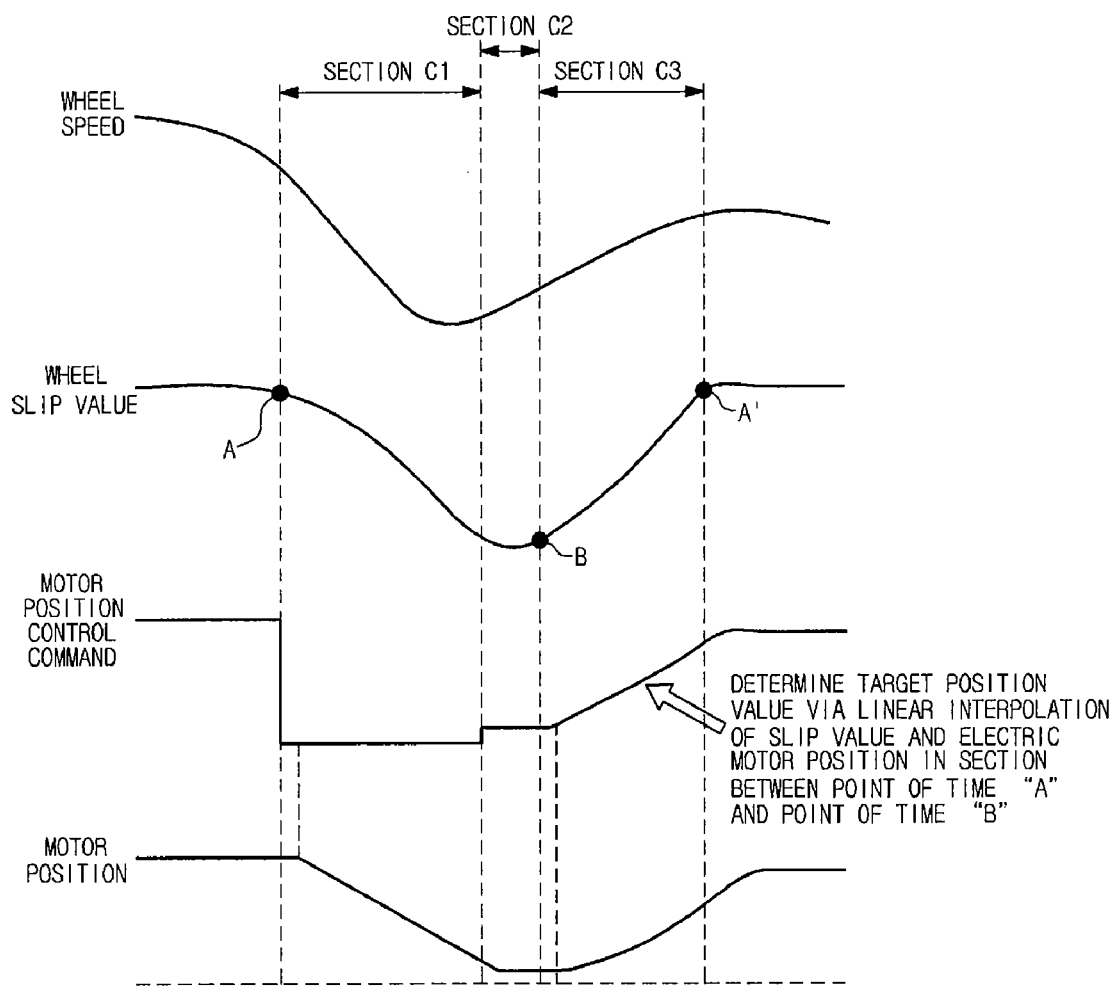
FIG. 3 is a view illustrating another example of an ABS control pattern of the electronic brake in accordance with the embodiment of the present invention.

FIG. 2 is a view illustrating one example of an ABS control pattern of the electronic brake in accordance with the embodiment of the present invention, and FIG. 3 is a view illustrating another example of an ABS control pattern of the electronic brake in accordance with the embodiment of the present invention.

In FIGS. 2 and 3, the ABS control pattern may be broadly divided into a braking-release section C1 and a re-braking section C3.

The braking-release section C1 corresponds to an interval in which a brake device is released to reduce brake force if wheels begin to lock. The re-braking section C3 corresponds to an interval in which brake force is again applied as a wheel speed is sufficiently restored, i.e. becomes equal to a vehicle velocity.

In the braking-release section C1, the electronic brake control unit 30 applies a motor position control command to move the electric motor 40 to a ready position (i.e. a normal non-braking position). If the braking-release section C1 ends before the electric motor 40 reaches the ready position, the electric motor 40 is ready at a current position until the control unit 30 applies a re-braking command. Since the responsiveness of this section absolutely depends on the performance of an actuator, the electric motor 40 is operated such that the brake pads 50 are moved away from the rotor 60 until the wheel speed is restored to the maximum possible speed obtained by the actuator. However, a predetermined time delay occurs until the wheel speed actually responds to operation of the electric motor 40 and therefore, an actual distance between the rotor 60 and the brake pads 50 is slightly greater than an ideal distance. In the following re-braking section C3, the brake pads 50, spaced apart from the rotor 60 by a predetermined distance, are again moved toward the rotor 60 to generate brake force. In this case, if the brake pads 50 are moved at an excessively high speed, brake force generates before the wheel speed is sufficiently restored, thus causing the wheels to lock again. On the contrary, if the brake pads 50 are moved at an excessively low speed, brake force insufficiently generates due to delay of re-braking, thus causing an increase in stopping distance of the vehicle.

In the above described ABS control pattern in accordance with the embodiment of the present invention, a position of the electric motor 40 is recorded at a time when the wheels begin to lock, i.e. at a braking-release beginning time (i.e. a point of time "A") when the wheel slip value exceeds a predetermined value. The point of time "A" is a preset value.

Thereafter, a position of the electric motor 40 is recorded at a time when the wheel speed begins to be restored, i.e. at a time when the wheel slip value has the minimum value (here, the minimum value is a negative value and thus, the time physically represents a time when the greatest wheel slip value occurs, i.e. a point of time "B"). The point of time "B" is a preset value and is used to indicate that the wheel speed begins to be restored.

After the wheel slip value exceeds a value corresponding to the point of time "B", the electronic brake control unit 30 performs linear interpolation with respect to two factors, i.e. the wheel slip value and the position of the electric motor 40 in a section between the point of time "B" (the time when the wheel speed begins to be restored) and the point of time "A" (the time when braking-release is determined; the braking-release beginning time), to set a target position value of the electric motor 40 corresponding to the resulting wheel slip value.

FIG. 2 illustrates the case that the electric motor 40 reaches the ready position before the time when the wheel speed begins to be restored (i.e. the time when the wheel slip value exceeds the minimum value) because the performance of the actuator is sufficient to overcome wheel behavior. FIG. 3 illustrates the case that the actual position of the electric motor 40 does not reach the target position value before the time when the wheel speed begins to be restored because the performance of the actuator is not sufficient to overcome wheel behavior. In the latter case, operation of the electric motor 40 stops at the time when the wheel speed begins to be restored, and the electric motor 40 is kept ready at a current position until re-braking begins (section C2).

Hereinafter, the operational sequence and effects of an ABS control method of the electronic brake having the above described configuration will be described.

Figure 4:
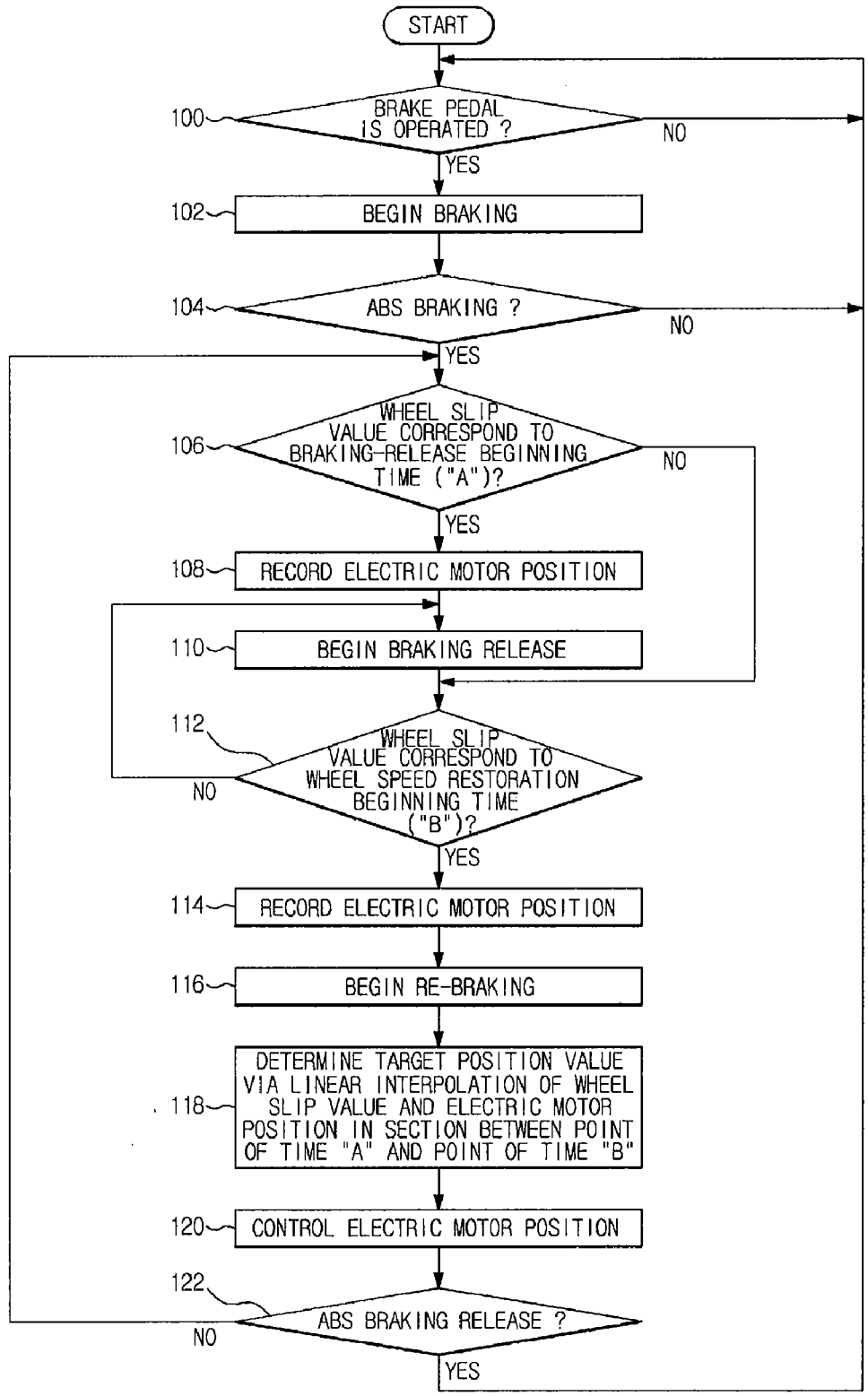
FIG. 4 is a flow chart illustrating the sequence of an ABS control method of the electronic brake in accordance with the embodiment of the present invention.

FIG. 4 is a flow chart illustrating the sequence of the ABS control method of the electronic brake in accordance with the embodiment of the present invention.

In FIG. 4, if the driver operates a brake pedal, the brake pedal position sensor 10 senses pedal force applied to the brake pedal by a driver, i.e. a position of the brake pedal and transmits a sensed signal to the electronic brake control unit 30.

The electronic brake control unit 30 determines whether or not the brake pedal is operated (100), and applies a motor position control command to the electric motor 40 to generate brake force corresponding to the pedal force applied to the brake pedal by the driver. As the electric motor 40 is operated according to the motor position control command to move the brake pads 50 toward the rotor 60, a braking operation begins (102).

If the wheel speed sensor 20 senses the speed of the wheels FL, RR, RF and FR during operation of the brake pedal and transmits a sensed signal to the electronic brake control unit 30, the electronic brake control unit 30 calculates a vehicle velocity upon receiving the signal indicating the wheel speed from the wheel speed sensor 20 to determine a wheel slip value based on a difference between the calculated wheel speed and the vehicle velocity, thereby determining whether or not to perform ABS braking (104).

If implementation of the ABS braking is determined, the electronic brake control unit 30 presets the point of time A (i.e. the braking-release beginning time when the wheels begin to lock) and the point of time B (i.e. the time when the wheel speed begins to be restored), to begin the ABS braking.

If the ABS braking begins, the electronic brake control unit 30 determines whether or not the wheel slip value has a value corresponding to the braking-release beginning time (the point of time A) (106). If the wheel slip value has a value corresponding to the braking-release beginning time, a position of the electric motor 40 at the braking-release beginning time (the point of time "A") is recorded (108).

Thereafter, the electronic brake control unit 30 applies a motor position control command to move the electric motor 40 to a ready position. If the braking-release section C1 ends before the electric motor 40 reaches the ready position, the electric motor 40 is ready at a current position until the control unit 30 applies a re-braking command. Since the responsiveness of this section absolutely depends on the performance of the actuator, the electric motor 40 is operated such that the brake pads 50 are moved away from the rotor 60 until the wheel speed is restored to the maximum possible speed obtained by the actuator.

Subsequently, the electronic brake control unit 30 determines whether or not the wheel slip value corresponds to the time when the wheel speed begins to be restored (the point of time B), i.e. the wheel slip value is the minimum value (112). If the wheel slip value corresponds to the wheel speed restoration beginning, a position of the electric motor 40 at the wheel speed restoration beginning time (the point of time "B") is recorded (114).

Thereafter, the electronic brake control unit 30 again moves the brake pads 50, spaced apart from the rotor 60 by a predetermined distance, toward the rotor 60, to generate brake force (in the re-braking section C3). In this case, if the brake pads 50 are moved at an excessively high speed, brake force generates before the wheel speed is sufficiently restored, thus causing the wheels to lock again. On the contrary, if the brake pads 50 are moved at an excessively low speed, insufficient brake force generates due to delay of re-braking, thus causing an increase in stopping distance of the vehicle.

Accordingly, after the wheel slip value exceeds a value corresponding to the point of time "B", the electronic brake control unit 30 performs linear interpolation of the wheel slip value and the position of the electric motor 40 in the section between the point of time "B" and the point of time "A", to determine a target position value of the electric motor 40 corresponding to the current wheel slip value (118). The electronic brake control unit 30 applies a motor position control command to the electric motor 40 according to the determined target position value of the electric motor 40, to control the position of the electric motor 40 such that the brake pads 50 are moved toward the rotor 60 in the re-braking section C3 (120).

As described above, if the wheel speed and vehicle velocity decrease during ABS braking in which braking and braking-release are repeated according to the wheel sleep value, the electronic brake control unit 30 determines whether or not ABS braking releases (122). If the ABS braking releases, the electronic brake control unit 30 feeds back to operation 100 to perform the following operations.

If it is determined in operation 122 that the ABS braking is not released, the electronic brake control unit 30 feeds back to the operation 106 to perform the following operations.

As is apparent from the above description, according to the embodiment of the present invention, an electric motor is controlled such that a position of a brake pad is linked with a change in wheel speed in a re-braking section of ABS braking in which braking and braking-release motions are repeated according to a wheel slip value. This may improve ABS control responding performance and reduce stopping distance by maximizing brake force utilization.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic brake control method to control a position of an electric motor during Anti-lock Brake System (ABS) braking in which braking and braking-release motions are repeated using an electronic brake, the method comprising:
   sensing a wheel speed;
   calculating a wheel slip value according to a change in the wheel speed;
   sensing the wheel slip value and the position of the electric motor at times when braking-release and re-braking sections begin respectively;
   determining a target position value of the electric motor corresponding to the wheel slip value by performing linear interpolation of the wheel slip value and the position of the electric motor in a section between the braking-release section and the re-braking section; and
   controlling the position of the electric motor in the re-braking section according to the determined target position value.

2. The method according to claim 1, wherein the control of the position of the electric motor includes applying a motor position control method to the electric motor according to the determined target position value so as to move a brake pad toward a rotor.

3. The method according to claim 2, wherein the position of the electric motor is controlled in the re-braking section such that a position of the brake pad is linked with a change in the wheel speed.

4. The method according to claim 1, wherein the wheel slip value is calculated from a difference between the wheel speed and a vehicle velocity.

* * * * *